United States Patent
Rajnak et al.

(10) Patent No.: US 10,318,261 B2
(45) Date of Patent: Jun. 11, 2019

(54) EXECUTION OF COMPLEX RECURSIVE ALGORITHMS

(71) Applicant: Mentor Graphics Corporation, Wilsonville, OR (US)

(72) Inventors: Antal Rajnak, Cologny (CH); Zoltán Mátyás, Göd (HU); Attila Srágli, Tata (HU)

(73) Assignee: Mentor Graphics Corporation, Wilsonville, OR (US)

( * ) Notice: Subject to any disclaimer, the term of this patent is extended or adjusted under 35 U.S.C. 154(b) by 289 days.

(21) Appl. No.: 14/950,947

(22) Filed: Nov. 24, 2015

(65) Prior Publication Data

US 2016/0147516 A1 May 26, 2016

Related U.S. Application Data

(60) Provisional application No. 62/083,800, filed on Nov. 24, 2014.

(51) Int. Cl.
*G06F 8/41* (2018.01)
*G06F 8/51* (2018.01)
(Continued)

(52) U.S. Cl.
CPC ............... *G06F 8/456* (2013.01); *G06F 8/51* (2013.01); *G06F 16/2455* (2019.01); *G06F 9/4484* (2018.02); *G06F 2212/401* (2013.01)

(58) Field of Classification Search
CPC ........ G06F 8/40–8/51; G06F 17/30477; G06F 9/4425; G06F 17/30339; G06F 17/30592; G06F 2212/401

(Continued)

(56) References Cited

U.S. PATENT DOCUMENTS

| 5,247,696 A | * | 9/1993 | Booth | G06F 8/452 708/441 |
| 6,934,808 B2 | * | 8/2005 | Nishiyama | G06F 9/30047 711/118 |

(Continued)

FOREIGN PATENT DOCUMENTS

JP 2015161983 A * 9/2015

OTHER PUBLICATIONS

How do I check if an array includes an object in JavaScript?, Stack Overflow, 2013, 13 pages, [retrieved on Nov. 29, 2017], Retrieved from the Internet: <URL:https://stackoverflow.com/questions/237104/how-do-i-check-if-an-array-includes-an-object-in-javascript/237176>.*

(Continued)

*Primary Examiner* — Geoffrey R St Leger
(74) *Attorney, Agent, or Firm* — Mentor Graphics Corporation

(57) ABSTRACT

This application discloses tools and mechanisms to convert a program from a sequentially-executable format into a parallel-executable format, and then modify the program in the parallel-executable format to either allow compilation for parallel execution or to speed-up the parallel execution by an accelerated processing unit. The tools and mechanisms can identify various features of the program, such as recursive calls, search loops, inline function calls, uncompressed data structures, memory utilization, and inter-dependent kernel instances. The tools and mechanisms can modify the program to replace or otherwise augment the identified features, which can allow the modified program to be compiled for parallel execution, or speed-up the parallel execution by an accelerated processing unit.

17 Claims, 6 Drawing Sheets

(51) Int. Cl.
　　*G06F 9/448*　　(2018.01)
　　*G06F 16/2455*　(2019.01)
(58) Field of Classification Search
　　USPC .................................. 717/136–137, 140–161
　　See application file for complete search history.

(56) References Cited

U.S. PATENT DOCUMENTS

| | | | | |
|---|---|---|---|---|
| 6,983,456 | B2 * | 1/2006 | Poznanovic | G06F 17/5045 717/132 |
| 7,590,977 | B2 * | 9/2009 | Archambault | G06F 8/443 717/140 |
| 8,849,644 | B2 * | 9/2014 | Tan | G06F 17/5022 703/13 |
| 9,304,898 | B2 * | 4/2016 | Solihin | G06F 12/0223 |
| 2003/0065888 | A1 * | 4/2003 | Nishiyama | G06F 8/4442 711/137 |
| 2004/0088685 | A1 * | 5/2004 | Poznanovic | G06F 17/5045 717/140 |
| 2005/0240930 | A1 * | 10/2005 | Amamiya | G06F 9/3012 718/100 |
| 2007/0089105 | A1 * | 4/2007 | Archambault | G06F 8/443 717/151 |
| 2007/0204268 | A1 * | 8/2007 | Drepper | G06F 9/461 718/102 |
| 2008/0082790 | A1 * | 4/2008 | Diyankov | G06F 9/3879 712/207 |
| 2009/0164198 | A1 * | 6/2009 | Tan | G06F 17/5022 703/16 |
| 2011/0067015 | A1 * | 3/2011 | Takagi | G06F 8/456 717/149 |
| 2013/0054546 | A1 * | 2/2013 | Solihin | G06F 12/0223 707/693 |

OTHER PUBLICATIONS

Hendren, L., et al., Parallelizing Programs with Recursive Data Structures, IEEE Transactions on Parallel and Distributed Systems, vol. 1, No. 1, Jan. 1990, pp. 35-47, [retrieved on Jan. 18, 2019], Retrieved from the Internet: <URL:http://ieeexplore.ieee.org/>.*

Herzeel, C., et al., Dynamic Parallelization of Recursive Code Part I, Proceedings of the ACM international conference on Object oriented programming systems languages and applications, 2010, pp. 377-396, [retrieved on Jan. 18, 2019], Retrieved from the Internet: <URL:http://dl.acm.org/>.*

* cited by examiner

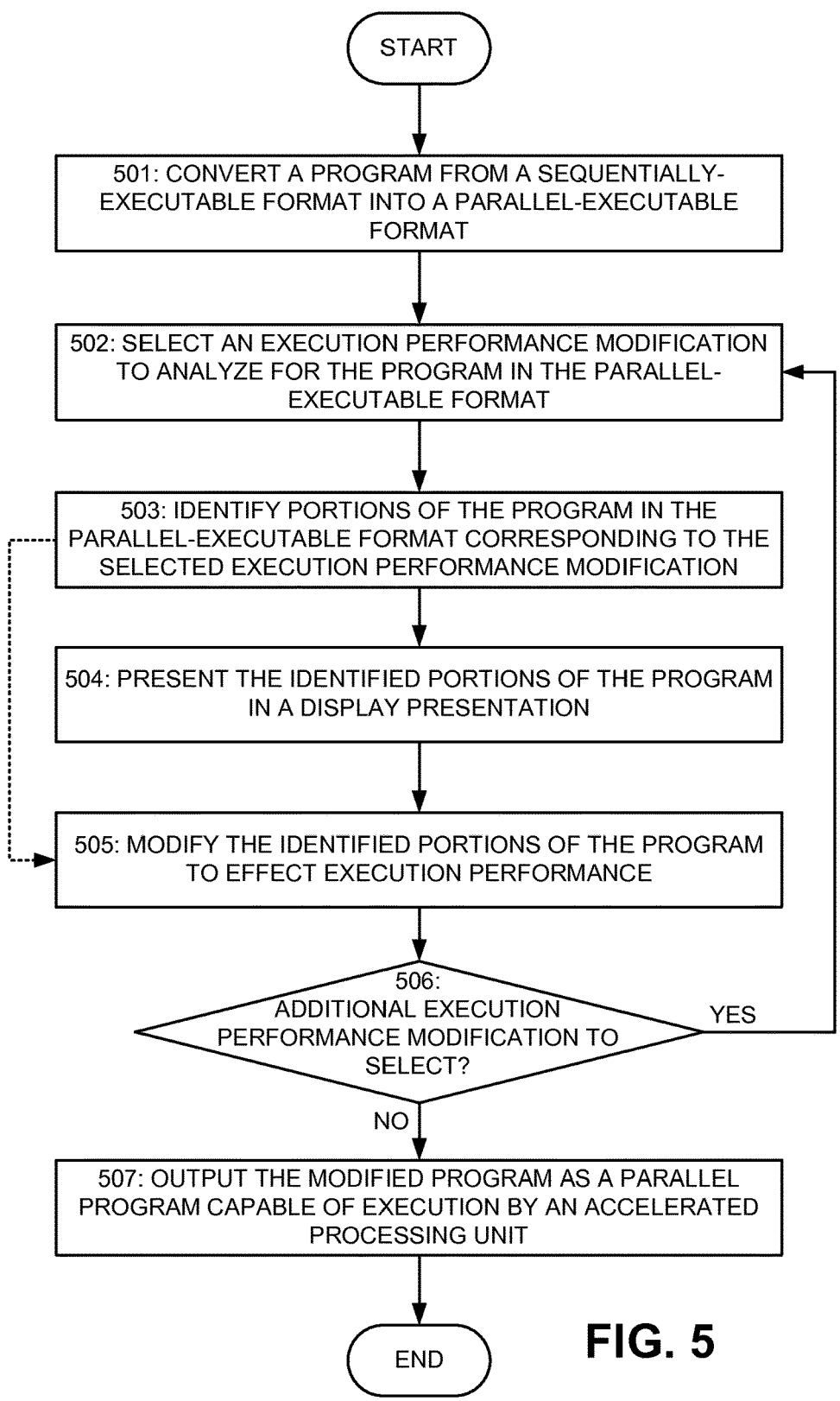

EXECUTION OF COMPLEX RECURSIVE ALGORITHMS

RELATED APPLICATION

This patent application claims priority to U.S. Provisional Patent Application No. 62/083,800, filed Nov. 24, 2014, which is incorporated by reference herein.

TECHNICAL FIELD

This application is generally related to execution of complex recursive algorithms, more specifically, to static analysis of electronic designs utilizing complex recursive algorithms.

BACKGROUND

Schedulability analysis for electronic designs has become increasingly important, especially when dealing with large complex multi-protocol network designs and verification. One specific type of schedulabilty analysis within the domain of Real-Time science determines a worst-case latency of packetized communication through a communication bus described in the electronic designs. Computing systems often employ dedicated and often very complex worst-case latency calculation algorithms, such as a Trajectory Approach algorithm, to determine a worst-case latency metric for an electronic design.

Practical usability of the Trajectory Approach, however, has been seriously limited when applied to sizable real-life systems, as the execution time of this type of worst-case latency calculation algorithm increases dramatically, often exponentially, with expanding state-space. This exponential increase of the execution time is often caused by the fact that the worst-case latency calculation algorithms take into consideration all blocking factors and then utilize the results recursively for calculations, e.g., such as end-to-end worst-case latency or the like.

There are less computation-intensive or "fast" algorithms, such as Network Calculus algorithm, which can provide a worst-case latency metric for sizable real-life systems. This resulting worst-case latency metric, however, is often overly pessimistic, causing designers to relax timing requirements of their electronic designs and inefficiently utilize available bandwidth. Thus, when tasked with identifying a worst-case latency metric in a sizable real-life system, designers have to trade-off speed and accuracy. As an example, the Trajectory Approach algorithm can give 50% less pessimistic results compared to Network Calculus algorithm, but the execution time using conventional computational methods can be prohibitive.

SUMMARY

This application discloses tools and mechanisms for improving execution time of complex recursive algorithms, for example, found in worst-case latency calculation algorithms, which can provide less pessimistic results of worst-case latency in an electronic system design without exponential execution delay. According to various embodiments, the tools and mechanisms can modify complex recursive algorithms into iterative parallel structures, which can be processed in parallel, for example, with an Accelerated Processing Units (APU), or the like.

In some embodiments, the tools and mechanisms to convert a program from a sequentially-executable format into a parallel-executable format, and then modify the program having the parallel-executable format to either allow compilation for parallel execution or to speed-up the parallel execution by the APU. The tools and mechanisms can identify various features of the program, such as recursive calls, search loops, inline function calls, uncompressed data structures, memory utilization, and inter-dependent kernel instances. The tools and mechanisms can modify the program to replace or otherwise augment the identified features, which can allow the modified program to be compiled for parallel execution, or speed-up the parallel execution by the APU. Embodiments will be described below in greater detail.

DESCRIPTION OF THE DRAWINGS

FIG. 5 illustrates an example flowchart for sequential-to-parallel conversion of a program with execution performance modifications according to various embodiments of the invention.

DETAILED DESCRIPTION

Illustrative Operating Environment

Figure 1:
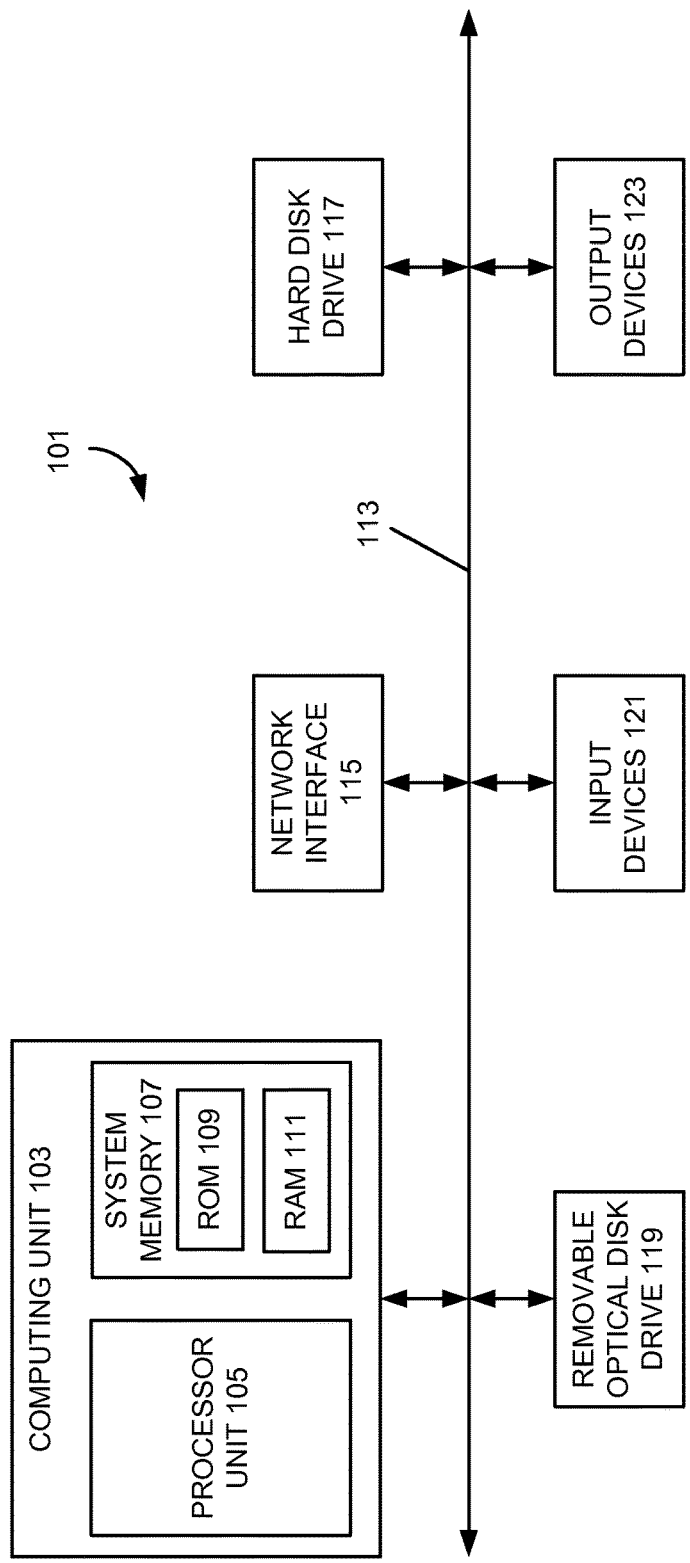
FIGS. 1 and 2 illustrate an example of a computer system of the type that may be used to implement various embodiments of the invention.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
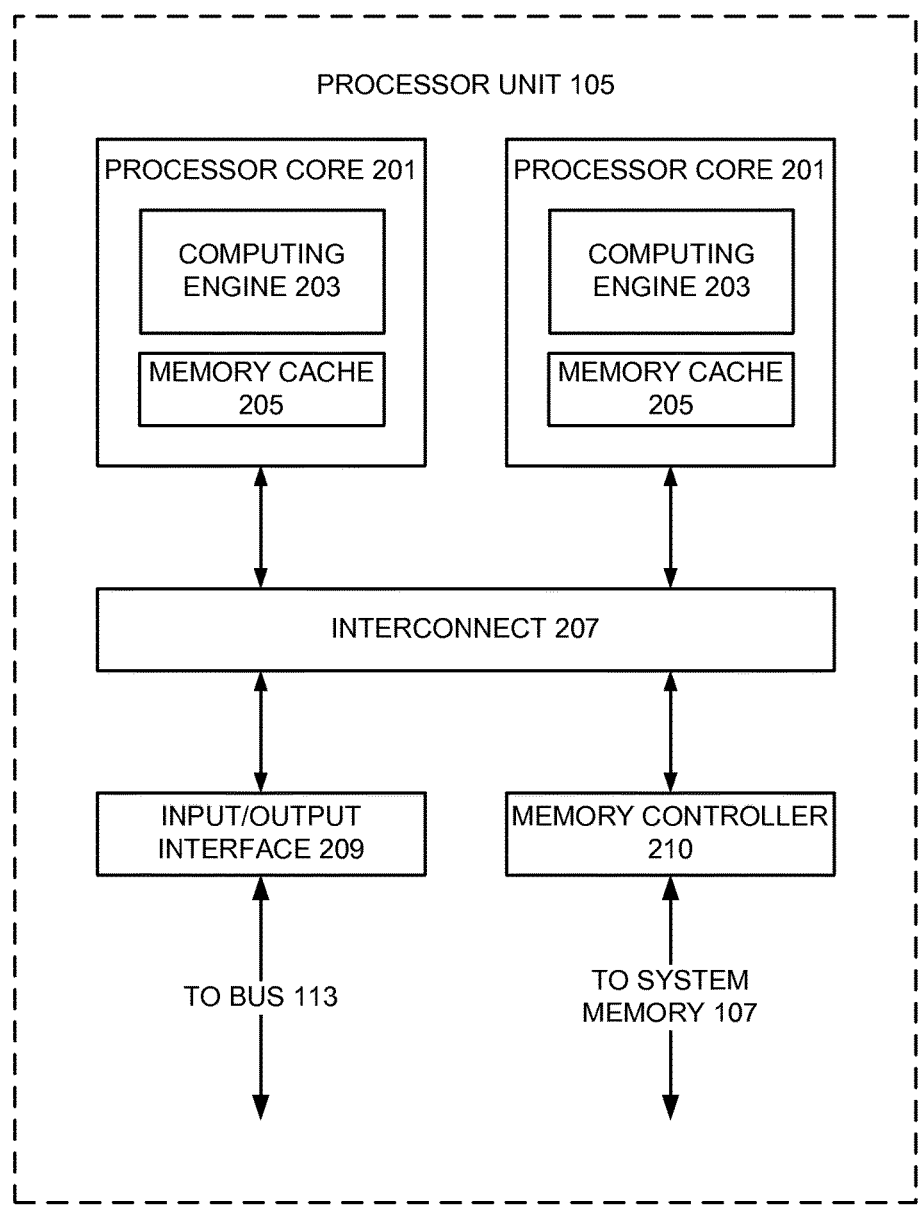

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface between the processor unit 105 and the bus 113. Similarly, the memory controller 210 controls the exchange of information between the processor unit 105 and the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Sequential-to-Parallel Conversion Tool

Figure 3:
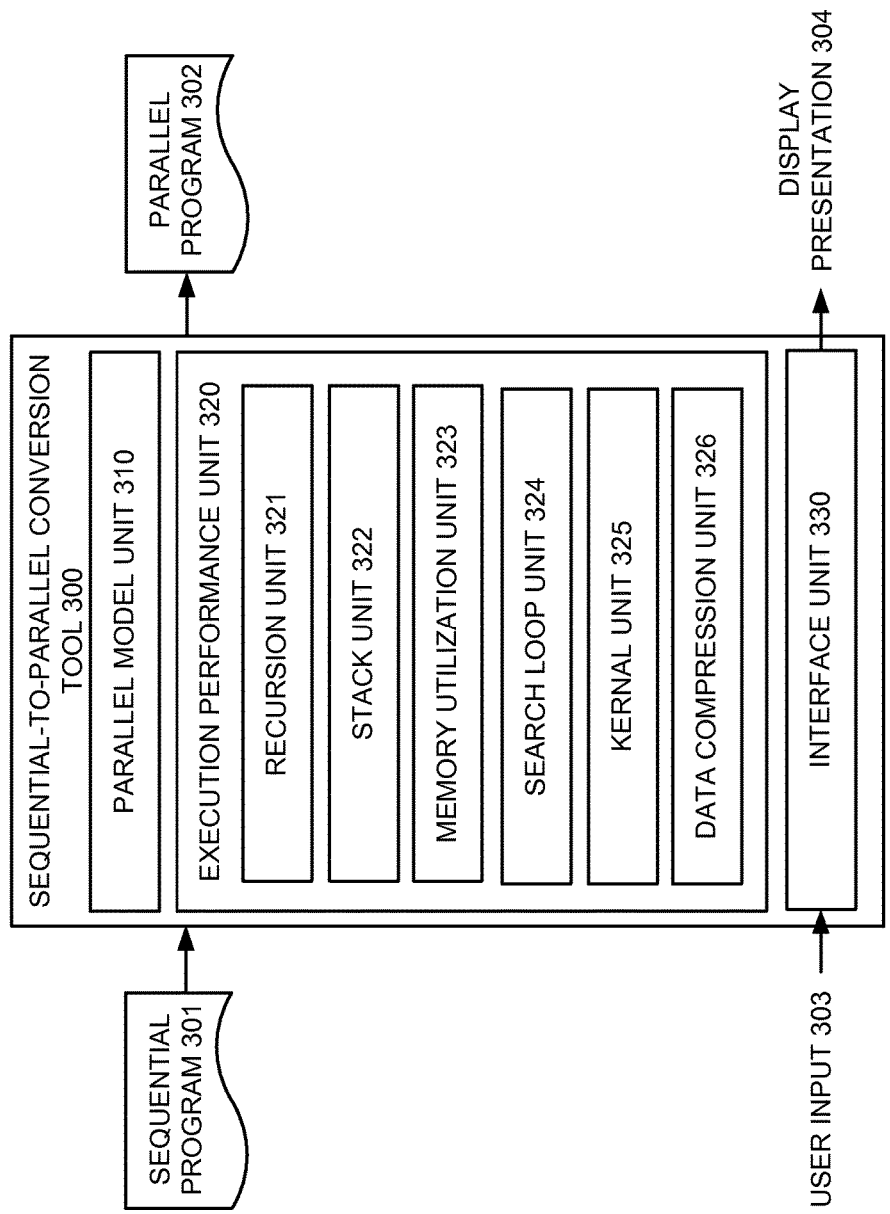
FIG. 3 illustrates an example sequential-to-parallel conversion tool according to various examples of the invention.

FIG. 3 illustrates an example sequential-to-parallel conversion tool 300 according to various examples of the invention. Referring to FIG. 3, the sequential-to-parallel conversion tool 300 can be implemented by a computing system, which, in some embodiments, can include the computing device 101 described in FIGS. 1 and 2. The sequential-to-parallel conversion tool 300 can receive a sequential program 301 having a sequential-executable format. The sequential program 301 can be written in a C or C++ programming language, or the like. In some embodiments, the sequential program can correspond to a worst-case latency calculation algorithm capable of determining a worst-case latency metric for an electronic design.

The sequential-to-parallel conversion tool 300 can convert the sequential program 301 into a parallel program 302. The sequential program 301 can include a parallel model unit 310 to convert the sequential program 301 from a sequentially-executable format into a parallel-executable format. For example, the parallel model unit 310 can convert sequential constructs in the sequential program 301 to parallel operations based on at least one parallel programming model, such as Compute Unified Device Architecture (CUDA), Open Computing Language (OpenCL), Open Accelerators (OpenACC), Open Multi-Processing (OpenMP), or the like. CUDA describes a parallel computing platform and application programming interface (API) model, which can allow software developers to use a graphics processing unit (GPU) for general purpose processing, also known as a general-purpose graphics processing unit (GPGPU). OpenCL describes a framework for programs capable of execution across heterogeneous platforms, for example, including central processing units (CPUs), GPUs, digital signal processors (DSPs), field-programmable gate arrays (FPGAs), other processors or hardware accelerators, or the like. OpenACC describes a programming standard for parallel computing, which, for example, can define annotations capable of being made to portions of program source code. These annotations can mark those portions of the program capable of being accelerated, for example, via compiler directives, additional functions or the like. OpenMP describes an application programming interface (API) to support multi-platform shared-memory multi-processing programming on a variety of computing platforms, processor architectures, and operating systems. The OpenMP APIs can include a set of compiler directives, library routines, and environment variables that can influence run-time behavior.

The parallel-executable program, which conforms to the parallel programming model, can be compiled and executed by parallel computing platforms or system. For example, Accelerated Processing Units (APUs) are one type of parallel computing platform or system that may be able to execute the parallel-executable program. In some embodiments, a low-cost graphical card built around a graphical processing unit (GPU), which is a type of APU, includes multiple processing units, each capable of executing several tasks in a parallel manner working on many sets of data (SIMD) simultaneously. Since APUs can have limited instruction sets and a different memory architecture compared to those supported by mainstream CPU platforms, the sequential-to-parallel conversion tool 300 can include an execution performance unit 320 to identify certain portions of the parallel-executable program, such as program structures, functions, calls, or other constructs, which could inhibit or slow down execution on the APU or GPU, and also modify the parallel-executable program based on the identified portions for execution on an APU or GPU. The sequential-to-parallel conversion tool 300 can output the modified parallel-executable program as the parallel program 302, which can be compiled and executed by the APU or GPU. Embodiments of modification of the parallel-executable program will be described below in greater detail, after a description of a parallel computing environment in FIGS. 4A and 4B.

Figure 4A:
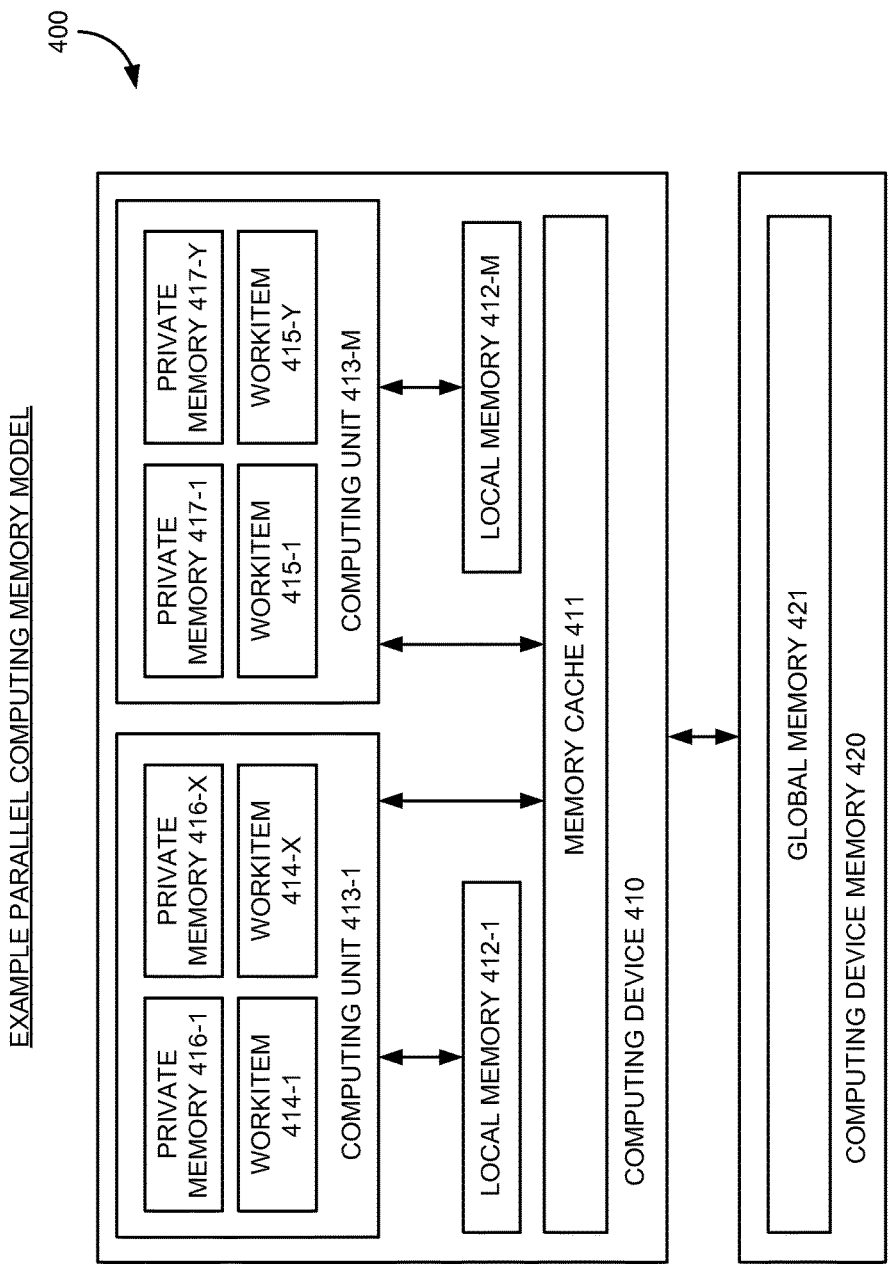
FIG. 4A illustrates an example parallel computing memory model according to various examples of the invention.

FIG. 4A illustrates an example parallel computing memory model 400 according to various examples of the invention. Referring to FIG. 4A, the parallel computing memory model 400 can describe an abstract model of a memory architecture, which can map to hardware once a specific parallel computing system has been selected for implementation. In some embodiments, the parallel computing memory model 400 can describe an OpenCL memory model hierarchy.

The parallel computing memory model 400 can include a computing device 410 having multiple computing units 413-1 to 413-M. In some embodiments, each of the computing units 413-1 to 413-M can include a plurality of processors or processing units (not shown) that can work independently or together to execute operations in work items 414-1 to 414-X and 415-1 to 415-Y. In some embodiments, a kernel can run on work item having a collection of parallel executions, for example, invoked by a command, which can be executed by one or more processing units as part of a work-group executing on one of the computing units 413-1 to 413-M. The work group can include a collection of related work-items 414-1 to 414-X and 415-1 to 415-Y that execute on the computing unit 413-1 to 413-M.

The parallel computing memory model 400 can include a variety of memories available for the computing units 413-1 to 413-M, such as a global memory 421, a memory cache 411, local memory 412-1 to 412-M, and private memory 416-1 to 416-X and 417-1 to 417-Y. The global memory 421, located in a computing device memory 420 external to the computing device 410, can be available to all of the computing units 413-1 to 413-M. The global memory 421 is typically the largest by capacity of the various memories in the parallel computing memory model 400, but practically-speaking also provides the slowest memory access to the computing units 413-1 to 413-M. The keyword_global can be added to a pointer declaration, which identifies data stored in the global memory 421.

The memory cache 411 can interface with the global memory 421 and the computing units 413-1 to 413-M to cache data accessed from the global memory 421. The memory cache 411 also can include a constant memory, for example a read-only section of memory, accessible to all of the computing units 413-1 to 413-M. In some embodiments, any element of constant memory can be simultaneously accessible by the work items 414-1 to 414-X and 415-1 to 415-Y in the computing units 413-1 to 413-M. Data declarations qualified by the keyword_constant can identify data stored in constant memory. Each local memory 412-1 to 412-M corresponds to different computing units 413-1 to 413-M to enable coalesced accesses to share data between work items 414-1 to 414-X and 415-1 to 415-Y in a work group. Data declarations qualified by the keyword_local can identify data stored in local memory. Each private memory 416-1 to 416-X and 417-1 to 417-Y can correspond to different work items 414-1 to 414-X and 415-1 to 415-Y. The private memory 416-1 to 416-X and 417-1 to 417-Y can be the fastest memory parallel computing memory model 400. In some embodiments, the private memory 416-1 to 416-X and 417-1 to 417-Y can be implemented on-chip in registers. Data declarations qualified by the keyword_private can identify data stored in private memory.

Figure 4B:
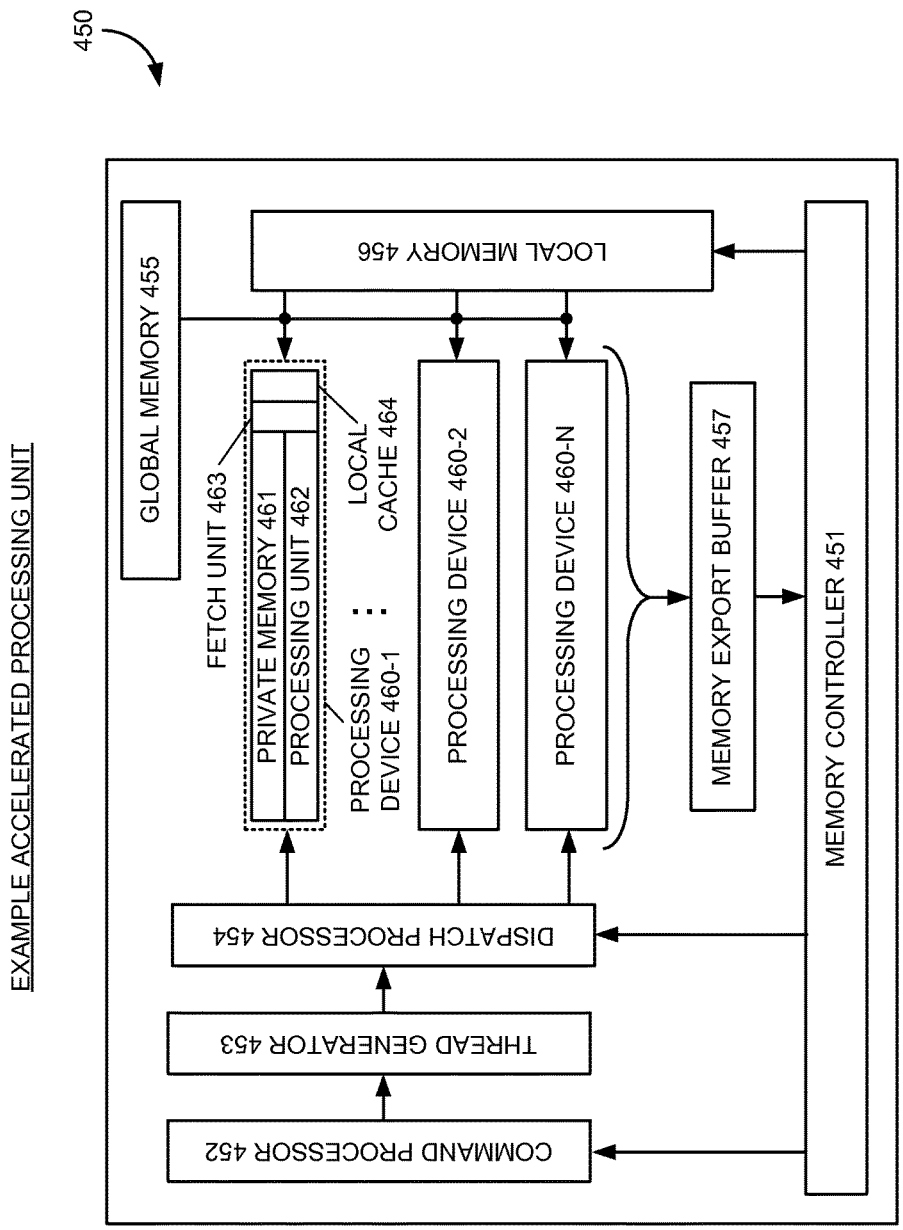
FIG. 4B illustrates an example accelerated processing unit according to various examples of the invention.

FIG. 4B illustrates an example accelerated processing unit 450 according to various examples of the invention. Referring to FIG. 4B, the accelerated processing unit 450 includes an array of processing devices 460-1 to 460-N capable of processing threads or work items in parallel. Each of the processing devices include a processing unit, such as processing unit 462 shown in processing device 460-1, a local memory, such as local memory 461 shown in processing device 460-1, a fetch unit, such as fetch unit 463 shown in processing device 460-1, and a local cache, such as local cache 464 shown in processing device 460-1. In some embodiments, the processing units 462 can include a single-instruction, multiple data (SIMD) engine or processor, which can correspond to a class of parallel computers in Flynn's taxonomy.

The accelerated processing unit 450 can include control circuitry, such as a command processor 452, a thread generator 453, and a dispatch processor 454, which can receive commands and instructions from a memory controller 451. The control circuitry can direct the processing devices 460-1 to 461-N to perform operations based on the commands and the instructions. In some embodiments, the command processor 452 can decode the commands received from the memory controller 451, for example, which can be in the form of high-level application programming interface (API) commands. The command processor 452 also can maintain states of the accelerated processing unit 450. The thread generator 453 can receive the decoded commands from the command processor 452 and map the decoded commands to different processing pipelines or threads associated with the processing devices 460-1 to 460-N in the accelerated processing unit 450. The dispatch processor 454 can receive instructions from the memory controller 451 and the decoded and mapped commands from the thread generator 453. The dispatch processor 454 can direct the processing devices 460-1 to 461-N to perform operations based on the mapped commands and the instructions.

The accelerated processing unit 450 can include various memories, such as a global memory 455 and a local memory 456, which can accessible by the processing devices 460-1 to 460-N. In some embodiments, the memory controller 451 can control the operations of the global memory 455 and the local memory 456. The accelerated processing unit 450 also can include a memory export buffer 457 to receive data processed by the processing devices 460-1 to 460-N, which can be provided to the memory controller 451. The memory controller 451, in some embodiments, can output the processed data or can direct the processed data to be stored back to the global memory 455 or the local memory 456.

Referring back to FIG. 3, the execution performance unit 320 can include a recursion unit 321 to unroll recursive portions of the parallel-executable program from the parallel model unit 310. Recursion portions of a source code can be utilized to perform a complex task, for example, by breaking the complex tasks into the several subtasks and implemented by calling itself to solve subtasks. During a recursive call, values of local fields can be placed on a memory area called stack memory until completion of the subtask performed in response to the recursive call.

Since some processing units, such as those utilized in APUs, or vector processors, such as those in general-purpose graphical processing units (GPGPUs), do not support recursive calls, when the parallel-executable program includes recursive portions, an error would be received during compilation. Further, these processing units and vector processor often do not have a stack memory capable of storing values of local fields until completion of the subtask performed in response to the recursive calls.

The recursion unit 321 can identify recursive portions of the parallel-executable program and replace them with conditional loops. In some embodiments, the recursion unit 321 can identify recursive portions of the parallel-executable program by locating a recursive call in the parallel-executable program. The sequential-to-parallel conversion tool 300 can include an interface unit 330, which can present any located recursive calls in a display presentation 304. In some embodiments, the recursion unit 321 can replace the identified recursive portions of the parallel-executable program with conditional loops automatically or based on user input 303 received by the interface unit 330.

An example of a recursive portion of parallel-executable program is shown below.

```
int factorial (int n) {
    if (n == 0) {
        return 1;
    } else {
        return n * factorial(n-1);
    }
}
```

While an example of a conditional loop replacing the recursive portion of the parallel-executable program is shown below.

```
int factorial (int n) {
    int result = 1;
    do {
        result *= n--;
    } while (n > 1) //replacing loop and condition
    return result;
}
```

Since conditional loops can be compiled for execution in parallel by processing units and vector processors, the parallel-executable program having its recursive portions replaced with the conditional loops can be both compiled and executed on an APU or a GPGPU.

The execution performance unit 320 can include a stack unit 322 to reduce consumption of a stack memory by the parallel program 302 during execution. In some embodiments, utilization of the stack memory can slow or stop execution of the parallel program 302. The tack unit 322 to reduce consumption of the stack memory in a variety of ways, including performing inline expansion of functional calls, reducing a number of local variables, a number and/or size of function parameters, or the like.

The stack unit 322 can identify functional the parallel-executable program and replace them with a copy of the function the identified functional calls reference, called inline expansion. In some embodiments, the stack unit 322 can mark or annotate the identified functional calls with a compiler directive. The compiler of the parallel program 302 can, in response to the compiler directive in the parallel program 302, perform the inline expansion during compilation. The interface unit 330 can present any located functional calls in a display presentation 304. In some embodiments, the stack unit 322 can perform the inline expansion or marking with a compiler directive automatically or based on user input 303 received by the interface unit 330.

The stack unit 322 also can identify functions the parallel-executable program having function parameters or local variables, and replace the local variables or function parameters with one or more pointers to the function parameters or local variables. During execution of the parallel program 302, the stack memory can store the one or more pointers to the function parameters or local variables rather than the function parameters or local variables themselves, which can reduce consumption of the stack memory.

An example of a function having function parameters is shown below.

```
//uses 8 bytes for a long + array
//size * 8 bytes
void foo(long id, long array[ ]);
```

The function foo can have function parameters long id and long array[ ]. These function parameters, during execution, could be stored on a stack memory of a processing unit of an APU.

An example code defining a pointer to the function parameters and the function with its function parameters replaced by the pointer is shown below.

```
typedef struct {
    long id;
    long array[ ];
} _PARAMETERS;
//just uses the size of the pointer
void foo(_PARAMETERS* parameters);
```

The execution performance unit 320 can include a memory utilization unit 323 to analyze the parallel-executable program to store variables in a memory from the parallel computing memory model based on memory size and latency. In some embodiments, frequently accessed variables can be cached in a private memory of a processing unit, such as registers in the processing unit. For example, when a processing unit intends to frequently access a global variable, the parallel-executable program can be modified to store the global variable as a private variable in a private memory of the processing unit. The processing unit can utilize the private variable via quick access via the private memory, and then update the global variable with the value of the private variable upon completion of its utilization by the processing unit. The memory utilization unit 323 also can analyze the parallel-executable program to utilize local memory associated with the parallel computing memory model for random memory access.

The memory utilization unit 323 can identify portions of the parallel-executable program capable of utilizing a faster memory in the parallel computing memory model, and can modify the parallel-executable program to allow variables or other data to utilize the faster memory. The interface unit 330, in some embodiments, can present the parallel-executable program capable of utilizing a faster memory in a display presentation 304. In some embodiments, the memory utilization unit 323 can modify the parallel-executable program to allow variables or other data to utilize the faster memory automatically or based on user input 303 received by the interface unit 330.

The execution performance unit 320 can include a search loop unit 324 to unroll search loops in the parallel-executable program from the parallel model unit 310. In some examples, a search loop, when executed, can iteratively and often sequentially check an array of values to find a value that matches a particular identifier.

The search loop unit 324 can identify search loops in the parallel-executable program and replace the search loops with a vector storing locations of identifiers in the array, which are indexable by the identifier. For example, when an identifier having a value of 20 is located in a position or field having a value of 5 in an array, the vector can store the value 5 in its position or field 20. Thus, the processing unit executing the parallel program can determine where the identifier in the array is located by looking up the value in the vector at the position corresponding to the value of the identifier.

The interface unit 330, in some embodiments, can present any search loops in a display presentation 304. The search loop unit 324 can replace the identified search loops in the parallel-executable program with array indexing vectors automatically or based on user input 303 received by the interface unit 330.

An example of a search loop is shown below.

```
for (i = 0; i < sizeof(array); i++) {
    if (array[i] == id) {
        // found
    }
}
```

In this portion code, the search loop can prompt the processing unit to sequentially compare each position or field in an array with an identifier id to determine whether the value in the position or field matches the identifier.

An example of a vector indexing an array is shown below.

```
// array indexing optimized for search
int value = array[id];
```

This portion of code describes a vector that, when indexed by the identifier, can provide a location or position in the array having a value that matches a value of the identifier.

The execution performance unit 320 can include a kernel unit 325 to divide tasks performed by a kernel in such a way as to control accesses to shared data structures. When multiple parallel processed kernel instances share data structures or rely on each other's resulting processing, one of the kernel instances may have to cease operations to wait for a different kernel instance to finish utilizing the shared data structure or complete its results and synchronize with the other kernel instance. The kernel unit 325 can identify synchronization points in kernel code, identify independent groups of data a shared data structure, and identify portions of the parallel-executable program capable of execution independently from each other.

The kernel unit 325 can identify synchronization points for a kernel in the parallel-executable program. The kernel, when executed by an accelerated processing unit, has multiple instances that share data structures with each other and synchronize at the synchronization points. The kernel unit 325 can modify the kernel to allow the instances to execute independently and without synchronization due to the shared data structures.

An example of a matrices multiplication function is shown below.

```
int p = sizeof(matrix1[0,]);
int q = sizeof(matrix1[,0]);
int r = sizeof(matrix2[,0]);
double[,] resp = new double[p, r];
for (int i = 0; i < p; i++)
    for (int j = 0; j < r; j++)
        for (int k = 0; k < q; k++)
            resp[i, j] += matrix1[i, k] * matrix2[k, j];
```

In this example, the kernel unit 325 could break apart the matrices multiplication function, for example, by dividing out two loops and allowing parallel execution of the matrices multiplication function using multiple work items processing independent parts of the matrices.

```
// set the number of work items in a workgroup
localWorkSize[0] = 16;
// set the total number of work items
globalWorkSize[0] = 1024;
// start parallel execution at the same time on each work item
int err = clEnqueueNDRangeKernel(commands, kernel, 2, NULL,
    globalWorkSize, localWorkSize, 0, NULL, NULL);
//this code runs on each work item
//and uploaded to the APU
__kernel void matrixMult(__global float * resp,
        __global float * matrix1,
        __global float * matrix2,
        __global int * q)
{
    // Vector element index
    int i = get_global_id(0);
    int j = get_global_id(1);
    int p = get_global_size(0);
    int r = get_global_size(1);
    resp[i + p * j] = 0;
    int QQ = q[0];
    for (int k = 0; k < QQ; k++)
        resp[i + p * j] += matrix1[i + p * k] * matrix2[k + QQ * j];
}
```

The interface unit 330, in some embodiments, can present those portions of the parallel-executable program corresponding to the synchronization points, those portions of the parallel-executable program capable of execution independently from each other, and possibly corresponding independent groups of data a shared data structure identified by the kernel unit 325, in a display presentation 304. In some embodiments, the kernel unit 325 could break apart the identified portions of the parallel-executable program capable of execution independently from each other automatically or based on user input 303 received by the interface unit 330.

The execution performance unit 320 can include a data compression unit 326 to identify a multi-dimensional data array or vector that include empty fields or duplicated data. The data compression unit 326 can compress the multi-dimensional data array or vector, for example, by removing the empty fields or duplicated data. In some embodiments, the data compression unit 326 can modify an indexing algorithm or look-up code utilized to access the compressed multi-dimensional data array to avoid at least of one cache misses or memory bank conflicts.

An example of a multi-dimensional data array or vector representing a port where two paths cross each other is shown below.

| path name | p0 | p1 | p2 | p3 |
|---|---|---|---|---|
| p0 | −1 | 2 | 3 | 4 |
| p1 | 2 | −1 | 5 | 6 |
| p2 | 3 | 5 | −1 | 7 |
| p3 | 4 | 6 | 7 | −1 |

An example of a compressed multi-dimensional data array or vector representing the port where two paths cross each other is shown below.

| path name | p0 | p1 | p2 | p3 |
|---|---|---|---|---|
| p0 | — | — | — | — |
| p1 | 2 | — | — | — |
| p2 | 3 | 5 | — | — |
| p3 | 4 | 6 | 7 | — |

The compressed matrix can have a Compression Ratio corresponding to 1−(0.5+matrix dimension/matrix size) *100 [%]. In this example, the matrix is two-dimensional and matrix size is 16 (or 4-by-4), so the Compression Ratio is 37.5% or 6/16. The compression of the multi-dimensional data array or vector can consume fewer processing and memory resources as well as provide a quicker load time during execution of the parallel program.

The interface unit 330, in some embodiments, can present multi-dimensional data array or vector that include empty fields or duplicated data in a display presentation 304. In some embodiments, the data compression unit 326 can compress the multi-dimensional data array or vector and modify the indexing algorithm or look-up code automatically or based on user input 303 received by the interface unit 330.

FIG. 5 illustrates an example flowchart for sequential-to-parallel conversion of a program with execution performance modifications according to various embodiments of the invention. Referring to FIG. 5, in a block 501, a computing system can convert a program from a sequentially-executable format into a parallel-executable format. For example, the computing system can convert sequential constructs in the program to parallel operations based on at least one parallel programming model, such as Compute Unified Device Architecture (CUDA), Open Computing Language (OpenCL), Open Accelerators (OpenACC), Open Multi-Processing (OpenMP), or the like.

In a block 502, the computing system can select at least one execution performance modification to analyze for the program in the parallel-executable format. As discussed above, the computing system can select from a variety of execution performance modifications, such as unrolling recursion, modification of stack memory utilizations, memory allocation, unrolling search loops, optimizing kernel synchronization, and compressing data structures. In some embodiments, the computing system can select these execution performance modifications alone or in any combination, and do so automatically or in response to user input.

In a block 503, the computing system can identify portions of the program in the parallel-executable format corresponding to the selected execution performance modification. Based on the selected execution performance modification(s), the computing system can scan, parse, or otherwise analyze the program in the parallel-executable format to identify portions of the code that may be capable of being modified to alter execution performance.

In a block 504, the computing system can optionally present the identified portions of the program in a display presentation. This optional operation can allow user-visibility into execution performance modification. In some embodiments, the display presentation can include the identified portions of the code, an identification of the selected execution performance modification, and/or a proposed modification to the identified portion of the code. The display presentation can be interactive, for example, the computing system can update the display presentation based on user input. For example, the computing system can receive user input that modifies the identified portions of code, modifies the proposed modification to the identified portion of the code, authorizes an automatic modification of the identified portion of the code, elects to pass on performing automatic modification of the identified portion of the code, de-selects the execution performance modification, or the like.

In a block 505, the computing system can modify the identified portions of the program to effect execution performance. The modifications to the identified portions of the program can vary depending on which execution performance modification was selected in the block 502, and were discussed above in detail.

In a block 506, the computing system can determine whether there is an additional execution performance modification to select. When additional execution performance modification can be selected, execution returns to block 502, where at least another execution performance modification can be selected for analysis by the computing system. When no additional execution performance modification will be selected, execution can proceed to a block 507, where the computing system can output the modified program as a parallel program capable of execution by an accelerated processing unit.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    converting, by a computing system, a program from a sequentially-executable format into a parallel-executable format;
    identifying, by the computing system, a recursive call and a search loop in the program in the parallel-executable format, wherein the computing system is configured to utilize the search loop to determine a location in a database that stores an identifier; and
    modifying, by the computing system, the program in the parallel-executable format to replace the identified recursive call with a conditional loop and to replace the identified search loop with a search vector storing values at locations in the search vector corresponding to values of identifiers stored in the database, wherein the values stored in the search vector correspond to positions of where the identifiers are stored in the database, and wherein the computing system is configured to index the search vector with the identifier to determine the location in the database that stores the identifier;
    compiling, by the computing system, the modified program; and
    executing, by at least one accelerated processing unit, the compiled program in parallel.

2. The method of claim 1, further comprising:
    identifying, by the computing system, a function call in the program; and
    performing, by the computing system, inline expansion of the identified function call, which replaces the function call with a corresponding function in the program.

3. The method of claim 2, further comprising marking, by the computing system, the identified function call for inline expansion, wherein the inline expansion of the identified function call is performed during the compilation of the modified program based on the marking.

4. The method of claim 1, further comprising:
    identifying, by the computing system, synchronization points for a kernel in the modified program, wherein the kernel, when executed by the accelerated processing unit in parallel, has multiple instances that share data structures with each other and synchronize at the synchronization points; and
    modifying, by the computing system, the kernel to allow the instances to execute independently and without synchronization due to the shared data structures.

5. The method of claim 1, further comprising:
    identifying, by the computing system, a memory model corresponding to the parallel-executable format; and
    augmenting, by the computing system, the modified program to utilize local memory associated with the memory model for random memory access or to utilize private memory associated with the memory model to store global variables.

6. The method of claim 1, further comprising:
    identifying, by the computing system, a multi-dimensional data array having duplicated or empty data fields;
    compressing, by the computing system, the multi-dimensional data array by removing the duplicated or empty data fields; and
    modifying, by the computing system, an indexing algorithm utilized to access the compressed multi-dimensional data array to avoid at least one of cache misses or memory bank conflicts.

7. A device comprising:
a memory device configured to store machine-readable instructions;
a computing system including one or more processing devices, in response to executing the machine-readable instructions, configured to:
convert a program from a sequentially-executable format into a parallel-executable format,
identify a recursive call and a search loop in the program in the parallel-executable format, wherein the computing system is configured to utilize the search loop to determine a location in a database that stores an identifier,
modify the program in the parallel-executable format to replace the identified recursive call with a conditional loop and to replace the identified search loop with a search vector storing values at locations in the search vector corresponding to values of identifiers stored in the database, wherein the values stored in the search vector correspond to positions of where the identifiers are stored in the database, and wherein the computing system is configured to index the search vector with the identifier to determine the location in the database that stores the identifier,
compile the modified program, and
at least one accelerated processing unit configured to execute, in parallel, the compiled program.

8. The device of claim 7, wherein the one or more processing devices, in response to executing the machine-readable instructions, are configured to:
identify a function call in the program; and
perform inline expansion of the identified function call based on a marking, which replaces the function call with a corresponding function in the program.

9. The device of claim 7, wherein the one or more processing devices, in response to executing the machine-readable instructions, are configured to:
identify synchronization points for a kernel in the modified program, wherein the kernel, when executed by the accelerated processing unit in parallel, has multiple instances that share data structures with each other and synchronize at the synchronization points; and
modify the kernel to allow the instances to execute independently and without synchronization due to the shared data structures.

10. The device of claim 7, wherein the one or more processing devices, in response to executing the machine-readable instructions, are configured to:
identify a memory model corresponding to the parallel-executable format; and
augment the modified program to utilize local memory associated with the memory model for random memory access or to utilize private memory associated with the memory model to store global variables.

11. The device of claim 7, wherein the one or more processing devices, in response to executing the machine-readable instructions, are configured to:
identify a multi-dimensional data array having duplicated or empty data fields;
compress the multi-dimensional data array by removing the duplicated or empty data fields; and
modify an indexing algorithm utilized to access the compressed multi-dimensional data array to avoid at least one of cache misses or memory bank conflicts.

12. An apparatus comprising at least one computer-readable memory device storing instructions configured to cause one or more processing devices to perform operations comprising:
converting a program from a sequentially-executable format into a parallel-executable format;
identifying a recursive call and a search loop in the program in the parallel-executable format, wherein the one or more processing devices are configured to utilize the search loop to determine a location in a database that stores an identifier;
modifying the program in the parallel-executable format to replace the identified recursive call with a conditional loop and to replace the identified search loop with a search vector storing values at locations in the search vector corresponding to values of identifiers stored in the database, wherein the values stored in the search vector correspond to positions of where the identifiers are stored in the database, and wherein the computing system is configured to index the search vector with the identifier to determine the location in the database that stores the identifier; and
compiling the modified program, wherein at least one accelerated processing unit executes the compiled program in parallel.

13. The apparatus of claim 12, wherein the instructions are further configured to cause the one or more processing devices to perform operations comprising:
identifying a function call in the program; and
performing inline expansion of the identified function call, which replaces the function call with a corresponding function in the program.

14. The apparatus of claim 13, wherein the instructions are further configured to cause the one or more processing devices to perform operations comprising marking the identified function call for inline expansion, wherein the inline expansion of the identified function call is performed during the compilation of the modified program based on the marking.

15. The apparatus of claim 12, wherein the instructions are further configured to cause the one or more processing devices to perform operations comprising:
identifying synchronization points for a kernel in the modified program, wherein the kernel, when executed by the accelerated processing unit in parallel, has multiple instances that share data structures with each other and synchronize at the synchronization points; and
modifying the kernel to allow the instances to execute independently and without synchronization due to the shared data structures.

16. The apparatus of claim 12, wherein the instructions are further configured to cause the one or more processing devices to perform operations comprising:
identifying a memory model corresponding to the parallel-executable format; and
augmenting the modified program to utilize local memory associated with the memory model for random memory access or to utilize private memory associated with the memory model to store global variables.

17. The apparatus of claim 12, wherein the instructions are further configured to cause the one or more processing devices to perform operations comprising:
identifying a multi-dimensional data array having duplicated or empty data fields;

compressing the multi-dimensional data array by removing the duplicated or empty data fields; and modifying an indexing algorithm utilized to access the compressed multi-dimensional data array to avoid at least one of cache misses or memory bank conflicts.

\* \* \* \* \*